United States Patent [19]

Bhagat et al.

[11] Patent Number: 5,278,891

[45] Date of Patent: Jan. 11, 1994

[54] GROUND-TO-AIR TELEPHONE CALLING SYSTEM AND RELATED METHOD

[75] Inventors: Jai P. Bhagat; William D. Hays; Ernest A. Oswalt, all of Jackson, Miss.

[73] Assignee: Mobile Telecommunication Technologies, Jackson, Miss.

[21] Appl. No.: 759,626

[22] Filed: Sep. 16, 1991

Related U.S. Application Data

[63] Continuation of Ser. No. 501,430, Mar. 22, 1990, abandoned, which is a continuation of Ser. No. 188,577, Apr. 29, 1988, abandoned.

[51] Int. Cl.$^5$ .................. H04M 11/00; H04B 7/185; H04B 1/00
[52] U.S. Cl. ............................ 379/58; 379/63; 455/12.1; 455/13.1; 455/56.1
[58] Field of Search ............... 340/825.04; 370/95; 375/116; 379/58, 60, 61, 63; 380/9; 455/12, 13, 56

[56] References Cited

U.S. PATENT DOCUMENTS

| | | | |
|---|---|---|---|
| Re. 28,377 | 2/1975 | Singer | 179/18 |
| 2,957,047 | 10/1960 | Wennemer | 179/18 |
| 3,506,791 | 4/1970 | Halaby | 179/41 |
| 3,641,276 | 2/1972 | Keller et al. | 179/18 |
| 3,742,498 | 6/1973 | Dunn | 455/13 |
| 3,902,022 | 8/1975 | Breeden et al. | 179/41 |
| 4,117,267 | 9/1978 | Haberle et al. | 455/12 |
| 4,162,377 | 7/1979 | Mearnes | 179/18 |
| 4,172,969 | 10/1979 | Levine et al. | 179/2 |
| 4,178,476 | 12/1979 | Frost | 179/2 |
| 4,191,860 | 3/1980 | Weber | 179/18 |
| 4,197,526 | 4/1980 | Levine et al. | 340/311 |
| 4,263,480 | 4/1981 | Levine | 179/2 |
| 4,313,035 | 1/1982 | Jordan | 179/18 BE |
| 4,336,524 | 6/1982 | Levine | 340/311.1 |
| 4,419,766 | 12/1983 | Goeken et al. | 455/56 |
| 4,455,651 | 6/1984 | Baran | 370/104 |
| 4,574,164 | 3/1986 | Orikasa | 179/2 |
| 4,577,060 | 3/1986 | Webb | 179/2 |
| 4,616,108 | 10/1986 | Yamaguchi et al. | 379/58 |
| 4,672,655 | 6/1987 | Koch | 379/58 |
| 4,672,656 | 6/1987 | Pfeiffer et al. | 379/58 |
| 4,677,656 | 6/1987 | Burke et al. | 379/63 |
| 4,694,473 | 9/1987 | Etoh | 375/116 |
| 4,700,374 | 10/1987 | Bini | 455/12 |
| 4,716,407 | 12/1987 | Borras et al. | 340/825.04 |
| 4,736,371 | 4/1988 | Tejima et al. | 370/95 |
| 4,747,122 | 5/1988 | Bhazat et al. | 379/58 |
| 4,771,448 | 9/1988 | Koohgoli et al. | 379/60 |
| 4,821,310 | 4/1989 | Lynk, Jr. et al. | 379/63 |
| 4,903,298 | 2/1990 | Cline | 380/9 |

FOREIGN PATENT DOCUMENTS 2749803 5/1979 Fed. Rep. of Germany.
0186633 3/1989 Japan .................. 379/61

OTHER PUBLICATIONS

Telocator, Nov. 1982.

*Primary Examiner*—Jin F. Ng
*Assistant Examiner*—William D. Cumming
*Attorney, Agent, or Firm*—Finnegan, Henderson, Farabow, Garrett & Dunner

[57] ABSTRACT

A ground-to-air telephone calling system is provided including a computer for receiving an airborne telephone number and a call-back number from a calling party and forming the telephone numbers into a data signal comporting with existing protocol filed in the FCC, an uplink unit for uplinking the data signal to a satellite and a plurality of downlink stations for receiving the data signal from the satellite; a plurality of ground stations corresponding to each of the downlink units for receiving the data signals and passing a call signal identifying the airborne telephone and particular ground station to a corresponding transmit/receive unit for subsequent transmission to the aircraft; a call being initiated from the ground station to the calling party over the public switched telephone network if the aircraft responds to the call signal.

8 Claims, 7 Drawing Sheets

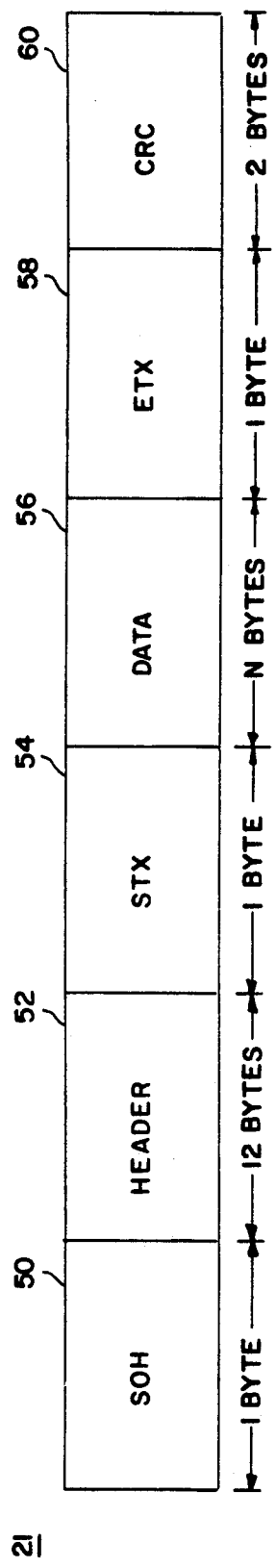
FIG. 3A DATA SIGNAL FORMAT
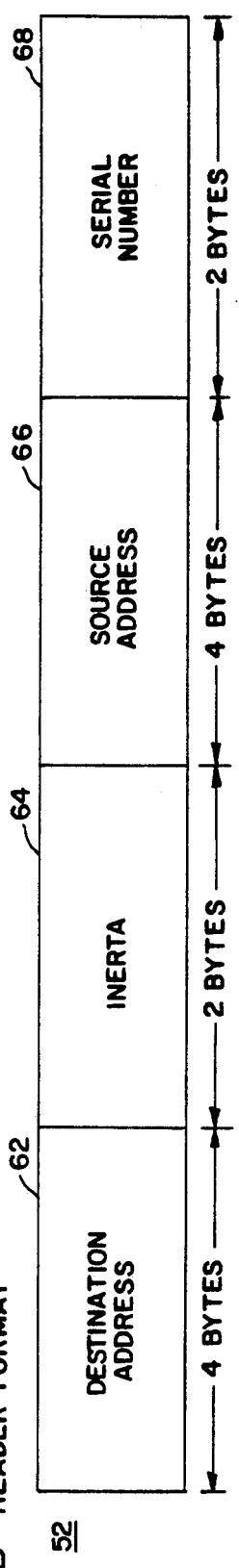
FIG. 3B HEADER FORMAT
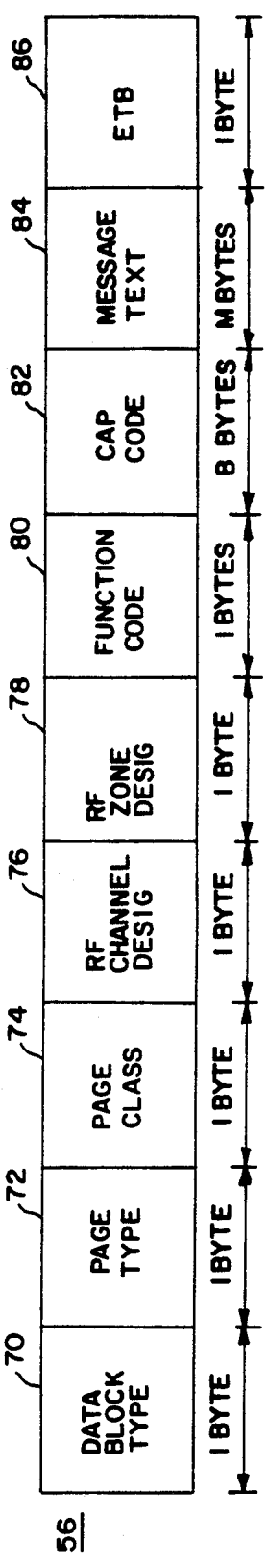
FIG. 3C DATA BLOCK FORMAT

GROUND-TO-AIR TELEPHONE CALLING SYSTEM AND RELATED METHOD This application is a continuation of application Ser. No. 07/501,430, filed Mar. 22, 1990 now abandoned which is a continuation of application Ser. No. 188,577, filed Apr. 29, 1988 now abandoned.

BACKGROUND OF THE INVENTION

1. Field of the Invention

The present invention relates to a ground-to-air telephone system which permits a ground based caller to establish telephonic communication with an airborne telephone of unknown location.

2. Background Information

Airborne telephone systems are well known and widely used. Such systems are typically utilized by a passenger on an aircraft to initiate a telephone call to a ground based party connected to the public switched telephone network (PSTN). Through such systems, an airborne party can initiate telephone calls to any telephone in the world. Such calls are transmitted from the airborne telephone to ground stations which route the telephone calls by way of the PSTN to the called party.

However, if a ground based party wishes to call an airborne telephone using such a system, the ground based party must know which specific ground station is within transmission range of the aircraft. This requirement necessitates that the ground based party know the particular location of the aircraft at any given time, thereby presenting prohibitive mapping requirements. As a result, ground-to-air telephone calls are seldom attempted because of the unfeasibility of knowing the particular location of an aircraft at any given time.

Mobile ground telephone systems, such as cellular systems, are known, wherein a central location coordinates the selection of calls, i.e., the central location selects which ground station is in communication with the mobile telephone and routes and completes the call accordingly. Such mobile ground systems are inadequate for airborne use, however, because the use of such a central location in airborne applications causes inadequate contention between ground stations for the selection of channel frequencies.

SUMMARY OF THE INVENTION

In view of the foregoing, an object of the present invention is to provide a ground-to-air telephone system by which a ground based caller can initiate a telephone call to an airborne telephone of unknown location.

An additional object of the present invention is to provide a ground-to-air telephone system in which no modifications or variations are required to known airborne telephones.

Another object of the present invention is to permit selected activation of ground stations to provide the system with regional or national extent.

A further object of the present invention is to eliminate contention between ground stations for channel frequencies.

Additional objects and advantages of the invention will be set forth in the description which follows and, in part, will be obvious from that description or may be learned by practice of the invention.

To achieve the foregoing objects and in accordance with the purpose of the invention as embodied and broadly described herein, a system for establishing telephonic communication between a ground based caller and an airborne telephone of unknown location is provided. A first data signal is formed and communicated in response to a telephone call from the ground based caller. The data signal includes at least data identifying the airborne telephone and data identifying the caller. Ground stations receive the first data signal and form call signals in response thereto. The call signals include at least data identifying the airborne telephone and data identifying the ground station transmitting the call signal. The call signals are then transmitted to possible aircraft locations. The airborne telephone forms and communicates an aircraft response signal to the ground station which transmitted the call signal received by the airborne telephone. Receivers located at each of the ground station receive the aircraft response signal from the airborne telephone if the aircraft received the call signal from a corresponding ground station. The ground based caller is then called in response to the aircraft response signal.

BRIEF DESCRIPTION OF THE DRAWINGS

FIGS. 3a–3c are diagrams illustrating the formats of particular signals used in the system of FIG. 1.

DESCRIPTION OF THE PREFERRED EMBODIMENT

Figure 1:
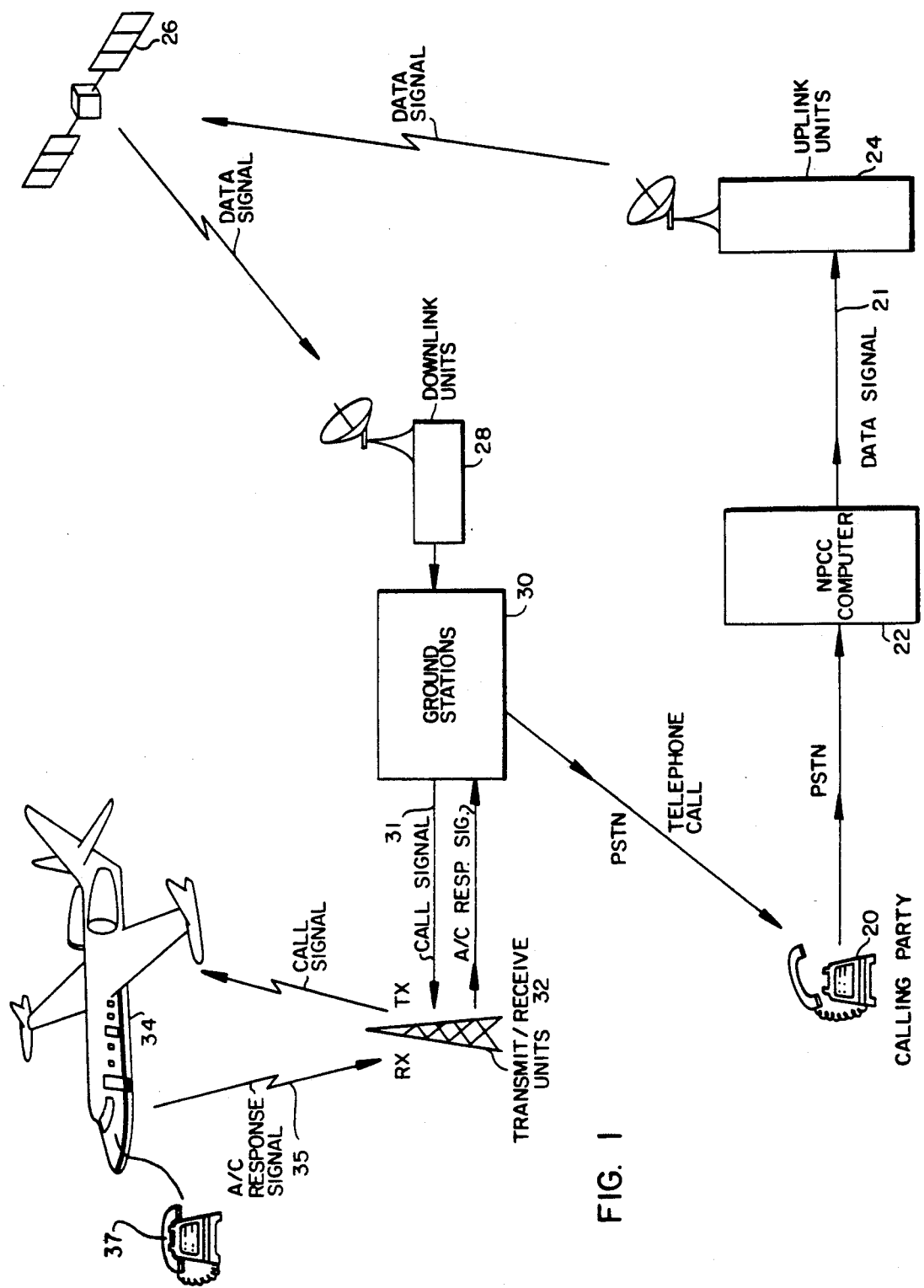
FIG. 1 is a general block diagram of a presently preferred embodiment of a ground-to-air telephone calling system incorporating the teachings of the present invention.

Referring now to FIG. 1, there is shown a generalized block diagram illustrating a ground-to-air telephone calling system incorporating the teachings of the present invention. The system of FIG. 1 includes a telephone 20, a national paging control computer (NPCC) 22, an uplink unit 24, a satellite 26, a plurality of downlink units 28, a plurality of ground stations 30, a plurality of transmit/receive units 32, and an aircraft 34 having a conventional airborne telephone 37 thereon.

Telephone 20 is coupled to the input of NPCC computer 22 via the public switched telephone network (PSTN). The output of NPCC computer 22 is coupled to the input of uplink unit 24 and passes a data signal 21 thereto. Data signal 21 is subsequently uplinked by uplink unit 24 to satellite 26 which transmits data signal 21 to downlink units 28. The output of each downlink unit 28 is coupled to an input of a corresponding ground station 30. Ground stations 30 receive data signals 21 from downlink units 28. An output of each ground station 30, i.e., a call signal 31, is coupled to an input of a corresponding transmit/receive unit 32. Each transmit/receive unit 32 subsequently transmits call signal 31 to possible aircraft locations. If the airborne telephone 37 on aircraft 34 receives a call signal from any transmit/receive unit 32, then an aircraft response signal 35 is formed and transmitted from the airborne telephone to the transmit/receive unit 32 from which the call signal was received. Aircraft response signal 35 is then passed from an output of transmit/receive unit 32 to an input of the corresponding ground station 30. Ground station 30 is coupled to the calling party over the PSTN.

In accordance with the teachings of the present invention, the calling party, via telephone 20, initiates a telephone call to NPCC computer 22. After receiving the telephone call, NPCC computer 22 then prompts the calling party to input an air-ground radiotelephone automated service (AGRAS) number, representing an identification number of the airborne telephone to be called. NPCC computer 22 further prompts the calling party to input a call-back number to which a subsequent telephone call can be placed to reach the calling party. After input of this information via telephone 20 over the PSTN, the calling party then hangs up his telephone.

NPCC computer 22 automatically generates data signal 21 and passes data signal 21 to uplink unit 24 via standard techniques, i.e., land lines, microwave transmissions, etc. The format of data signal 21 fully comports with established protocol filed with the FCC and will be discussed below in more detail in connection with FIGS. 3a-3c. Uplink unit 24 then transmits data signal 21 to satellite 26 in a conventional manner. Likewise, data signal 21 is reflected by satellite 26 to downlink units 28, as is known in the art. Each down link unit 28 has associated with it a corresponding ground station 30 and transmit/receive unit 32. Preferably, down link units 28 are distributed nationwide, thus providing nationwide ground-to-air calling ability. The structure and function of ground stations 30 will be discussed below in more detail in connection with FIG. 2.

Data signal 21 received from satellite 26 by downlink unit 28 is automatically passed to ground station 30. Ground station 30 receives and unpacks data signal 21 and outputs call signal 31, which comprises the AGRAS number and a ground station identification number. Each ground station is assigned a unique ground station identification number and, therefore, each call signal 31 output from a ground station 30 is unique. Each call signal 31 is transmitted by its corresponding transmit/receive unit 32.

If aircraft 34 is within transmission range of a particular transmit/receive unit 32, then the call signal transmitted by that transmit/receive unit will be received by the airborne telephone on aircraft 34. In response thereto, the airborne telephone forms and transmits aircraft response signal 35 on the same frequency channel on which call signal 31 was received, i.e., to same transmit/receive unit 32 which transmitted the call signal received. Aircraft response signal 35 is passed from transmit/receive unit 32 to its corresponding ground station 30. In response to aircraft response signal 35, ground station 30 automatically initiates a telephone call over the PSTN to telephone 20. When the calling party answers the call, the calling party is connected via ground station 30 and transmit/receive unit 32 to the airborne telephone located in aircraft 34.

Figure 2:
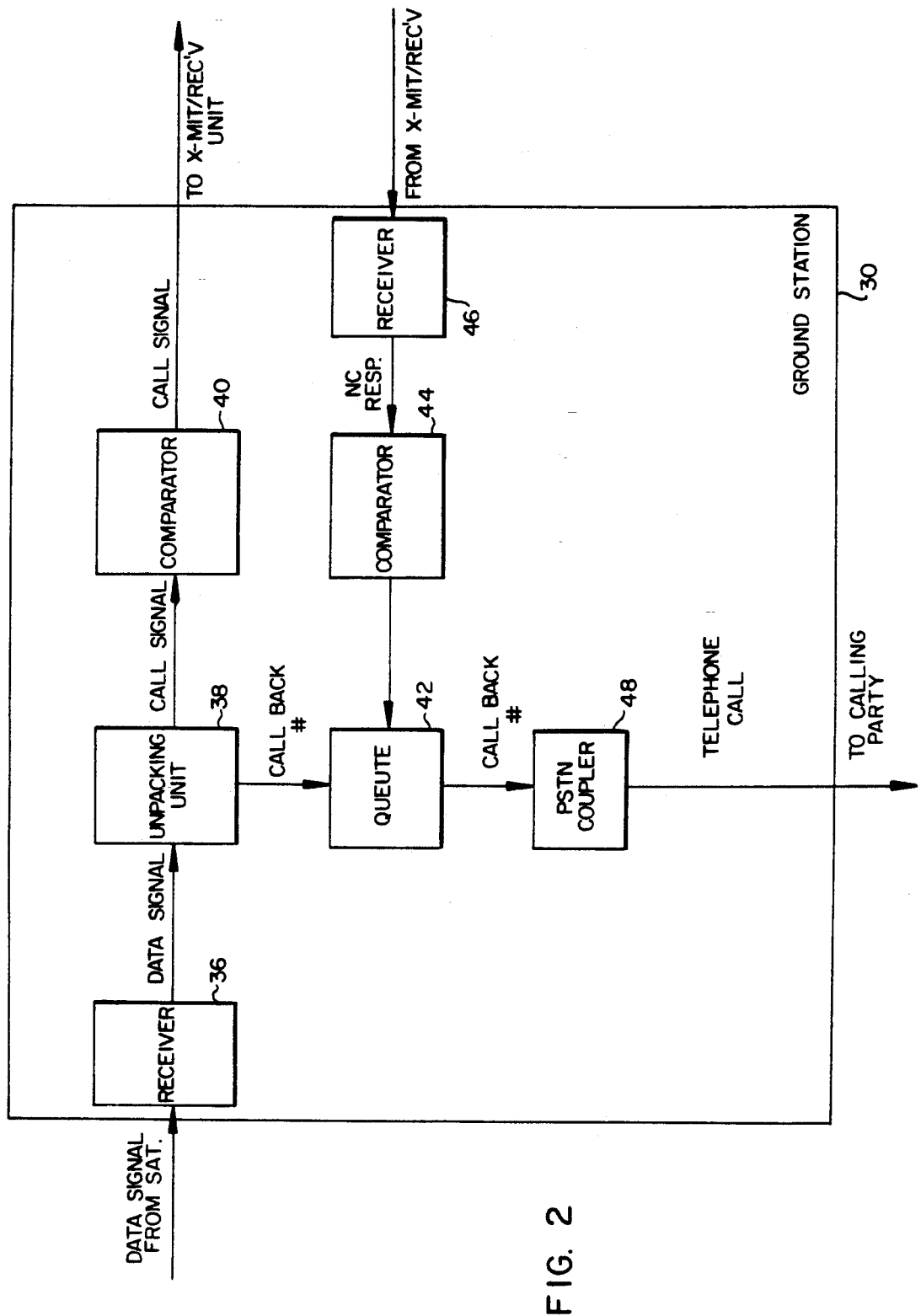
FIG. 2 is a detailed block diagram of a ground station utilized in the system of FIG. 1.
Figure 4A:
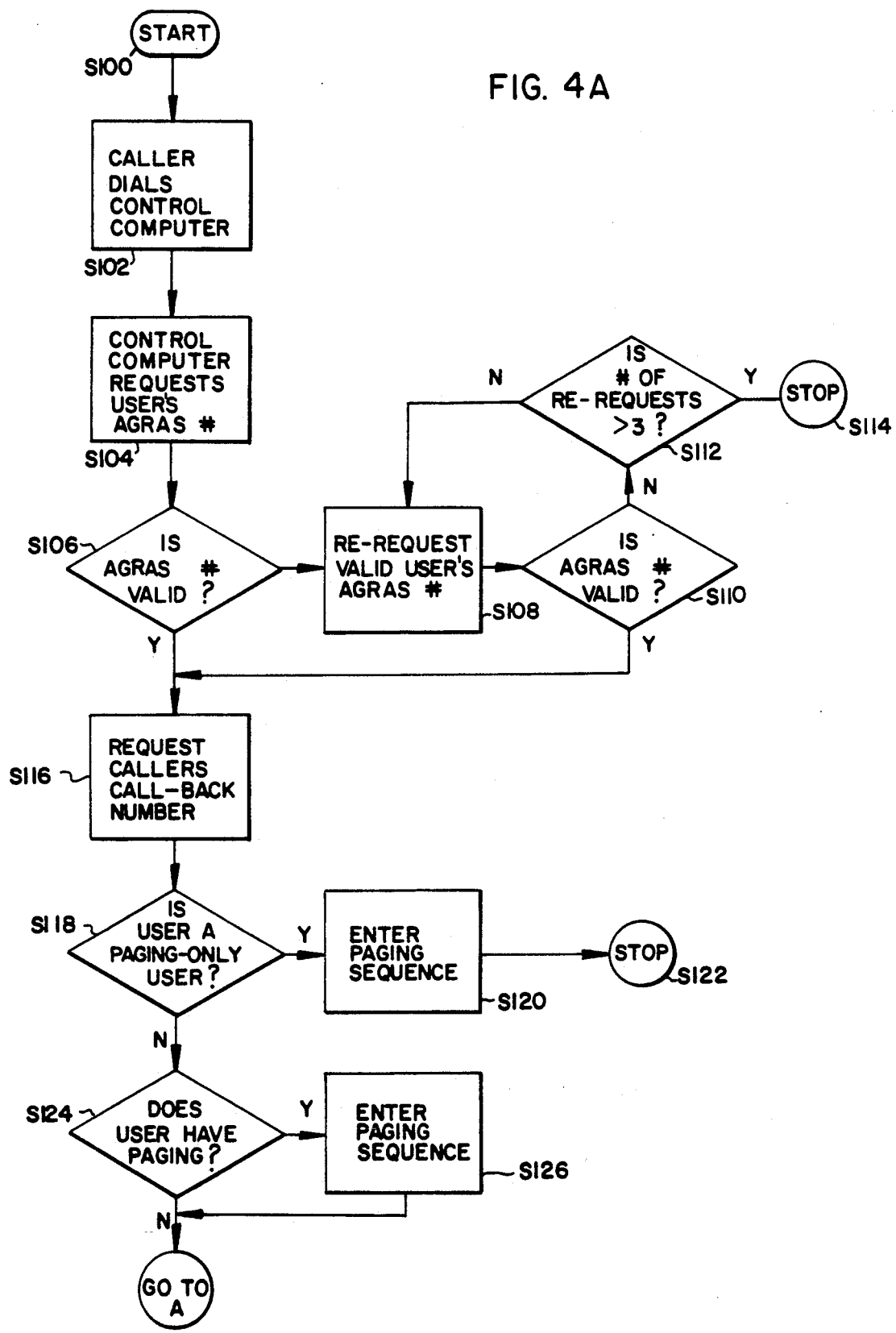
FIGS. 4a–4d are flow charts of the operation of a ground-to-air telephone system incorporating the teachings of the present invention.
Figure 4B:
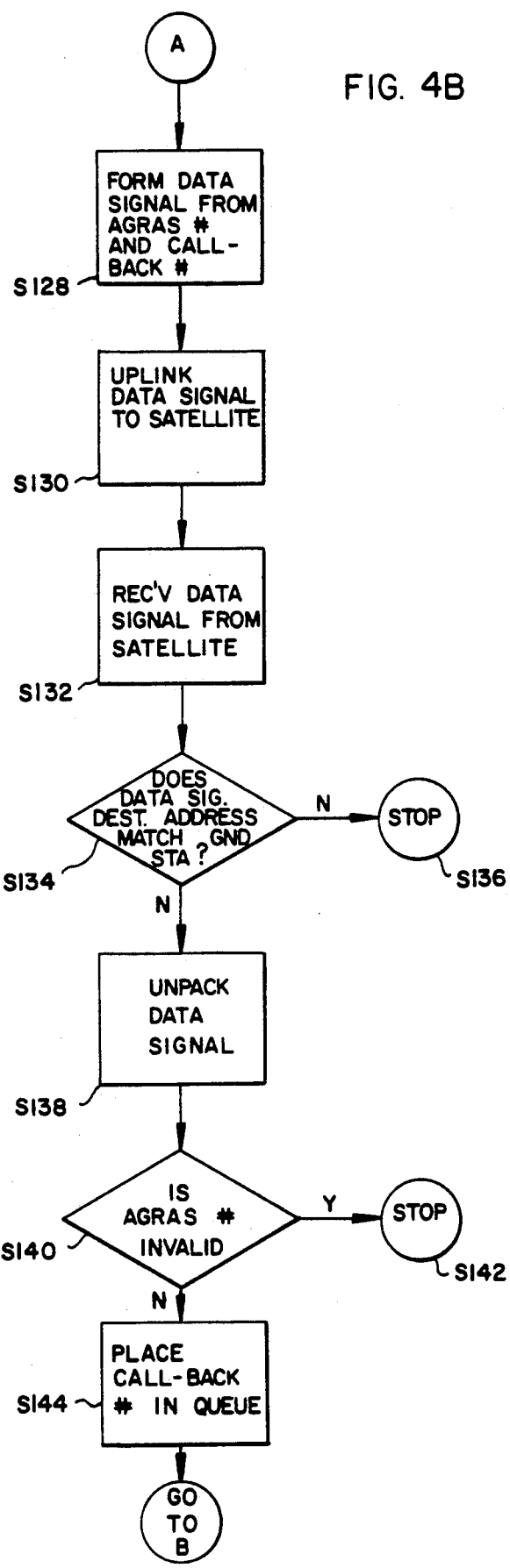
Figure 4C:
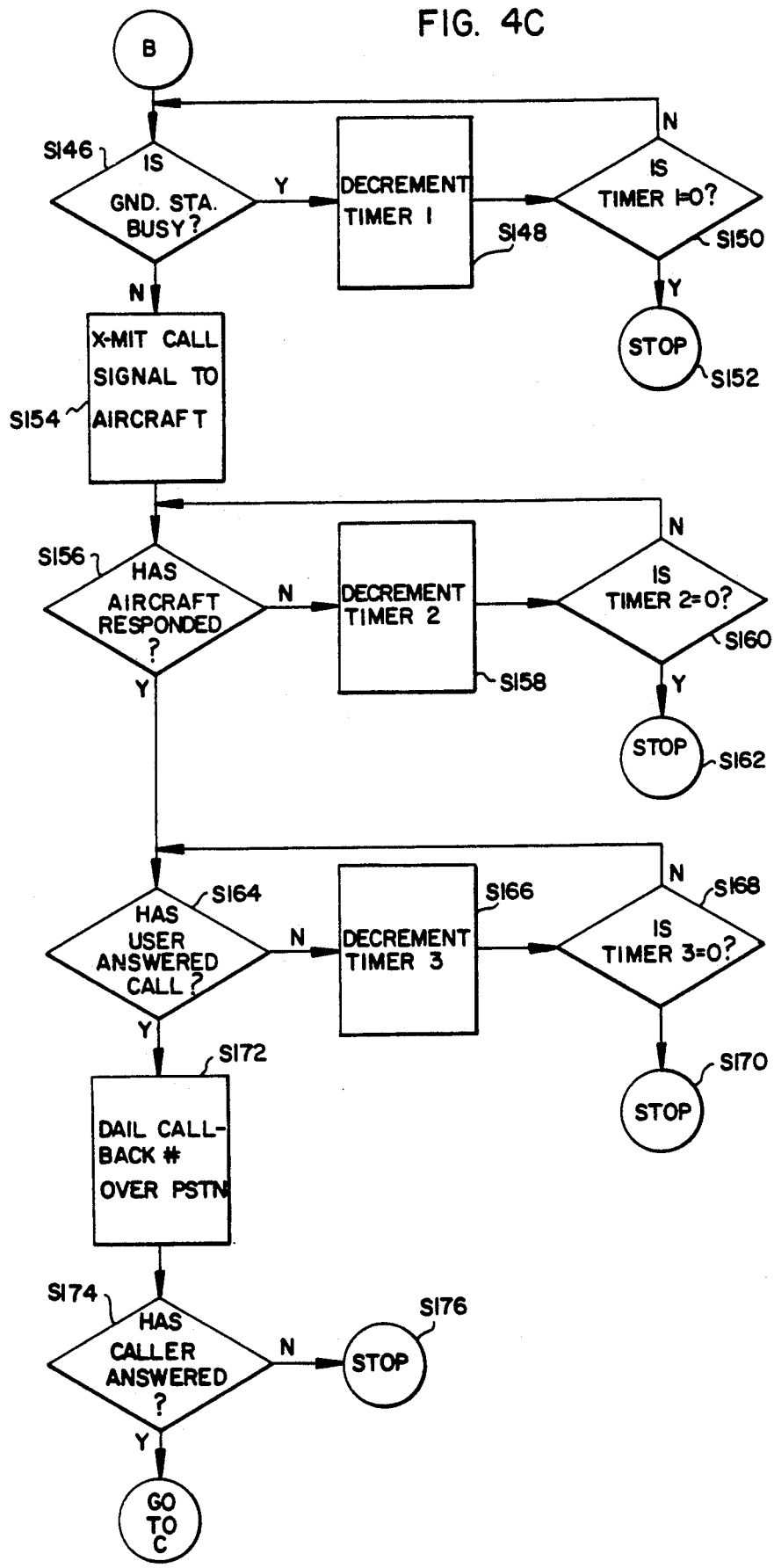
Figure 4D:
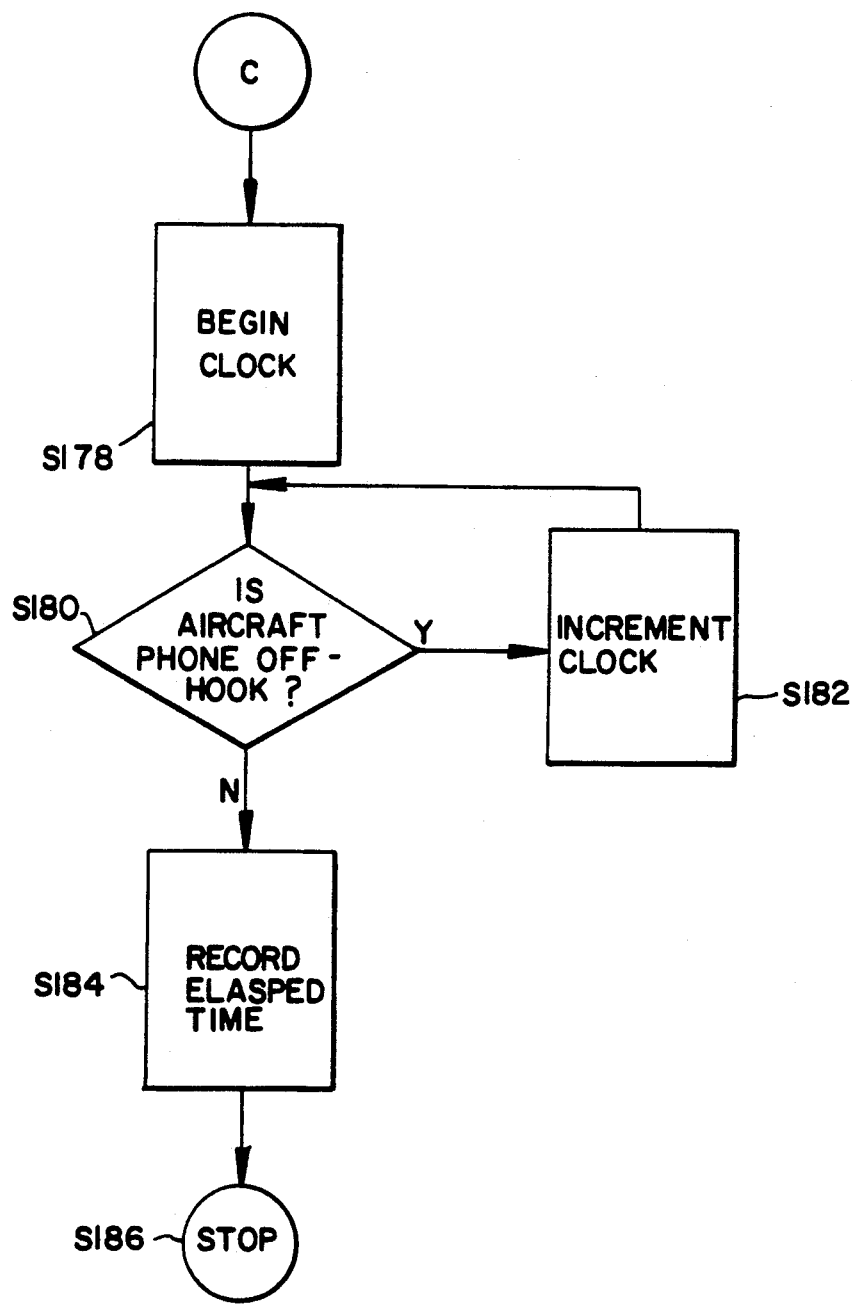

FIG. 2 is a more detailed block diagram of ground station 30 illustrated in FIG. 1. Specifically, ground station 30 includes a first receiver 36, an unpacking unit 38, a first comparator 40, a queue 42, a second comparator 44, a second receiver 46, and a PSTN coupler 48.

An input of first receiver 36 receives data signal 21 from satellite 26, as illustrated in FIG. 1. Data signal 21 is passed from an output of first receiver 36 to an input of unpacking unit 38. Unpacking unit 38 unpacks the data signal 21 and outputs the call-back number to queue 42. Unpacking unit 38 further outputs call signal 31 to first comparator 40. Call signal 31 includes the AGRAS number of the airborne telephone to be called, as well as ground station identifying information. First comparator 40 compares the AGRAS number contained in call signal 31 against a list of invalid AGRAS numbers. If the AGRAS number contained in call signal 31 is found by first comparator 40 to be not invalid (i.e. valid), then call signal 31 is output from first comparator 40 to a corresponding transmit/receive unit 32.

As described above, call signal 31 is transmitted by transmit/receive unit 32 to potential locations of aircraft 34. If aircraft 34 is within the transmission range of transmit/receive unit 32, then aircraft the airborne telephone on aircraft 34 returns aircraft response signal 35 to the same transmit/receive unit 32. Aircraft response signal 35 is output from transmit/receive unit 32 to an input of second receiver 46. Second receiver 46 outputs aircraft response signal 35 to an input of second comparator 44 which verifies that ground station identifying information included in aircraft response signal 35 corresponds to the address of the ground station receiving the aircraft response signal. If aircraft response signal 35 has been received by the correct ground station 30, aircraft response signal 35 is output from second comparator 44 to an input of queue 42. Queue 42 then outputs the call-back number to an input of PSTN coupler 48 which initiates a telephone call to the calling party over the PSTN.

The formats of various signals used in the ground-to-air telephone calling system of the present invention will now be described in detail in connection with FIGS. 3a-3c. As shown in FIG. 3a, data signal 21 includes a start-of-header (SOH) flag 50, a header 52, a start-of-text (STX) flag 54, data blocks 56, and end flag (ETX) 58, and cyclic redundancy check code (CRC) 60.

SOH flag 50 preferably comprises one byte of data and identifies the beginning of header 52. Header 52 indicates the source and destination of each data block 56 and is described in more detail below in connection with FIG. 3b. STX flag 54 preferably comprises one byte of data and identifies the beginning of data blocks 56. Data blocks 56 are discussed in more detail below in connection with FIG. 3c. ETX flag 58 preferably comprises one byte of data and identifies the end of data blocks 56. CRC 60 preferably comprises two bytes of data which check for errors in the format of data signal 21.

As shown in FIG. 3b, header 52 includes a destination address 62, an inertia field 64, a source address 66, and a serial number 68. Destination address 62 preferably comprises four bytes of data allowing for the identification of 65,535 possible destination addresses identifying ground stations selected to receive data signal 21. By varying destination address 62, regional programability of ground stations may be achieved. Inertia field 64 preferably comprises two bytes of data and represents a value used to determine whether a particular data signal 21 is still valid. Source address 66 preferably comprises four bytes of data representing a source address within NPCC computer 22. Serial number 68 perferably comprises two bytes of data and is used to uniquely identify a particular data signal 21 in order to prevent redundant transmission.

As illustrated in FIG. 3c, data block 56 is of a variable length and includes a data block type field 70, a page type field 72, a page class field 74, an RF channel designator field 76, an RF zone designator field 78, a function code field 80, a cap code field 82, a message text field 84, and an end-of-block (ETB) field 86.

Data block type field 70 preferably comprises one byte of data and describes the format of data block 56. Page type field 72 preferably comprises one byte of data and describes a signalling code used with the particular AGRAS number being called. Page class field 74 preferably comprises one byte of data and describes the message and coding class of the airborne telephone identified by the particular AGRAS number. RF channel designator field 76 preferably comprises one byte of data identifying the particular channel frequency used by transmit/receive unit 32. RF zone designator field 78 preferably comprises one byte of data and identifies the particular frequency zone within the channel identified by RF channel designator field 76 in which transmission by transmit/receive unit 32 will occur. Function code field 80 preferably comprises one byte of data and, identifies the priority of call signal 31. Cap code field 82 preferably comprises eight bytes of data and identifies the specific type of airborne telephone identified by the AGRAS number. Message text field 84 is of variable length and consists of characters identified the AGRAS number and call-back number input by the calling party to NPCC computer 22. ETB field 86 identifies the end of message text field 84.

The operation of the system of FIG. 1 will now be described with reference to the flow charts of FIGS. 4a–4d. In order to initiate a ground-to-air telephone call using the system of FIG. 1, the calling party dials NPCC computer 22 over the PSTN in step S102. In response to the call, NPCC computer 22 requests the AGRAS number of the airborne telephone to be called. The calling party then inputs, via telephone 20, the AGRAS number of the airborne telephone in step S104. NPCC computer 22 then checks the validity of the AGRAS number input in step S106 and, if the AGRAS number is found to be invalid, re-requests a valid AGRAS number from the calling party in step S108. If the calling party fails to input a valid AGRAS number in three attempts, operation of the system is terminated, as shown in steps S110, S112, and S114. If a valid AGRAS number has been input by the calling party, NPCC computer 22 then requests a call-back number in step S116. After inputting the call-back number, the calling party then hangs up.

Next, in step S118, NPCC computer 22 determines from the valid AGRAS number whether the AGRAS number identifies a paging only user. This step is desired because a common AGRAS number may preferably be used to identify an airborne telephone and/or a paging unit (not shown). The user has the option of selecting whether his AGRAS number is valid for an airborne telephone, paging unit, or both. If the user is a paging-only user, then the user is paged using a known paging sequence (step S120), and the operation is terminated (step S122). If the determination in step S118 is that the user is not a paging only user, thus indicating that the AGRAS number corresponds to an airborne telephone, it is next determined, in step S124, whether the user's AGRAS number permits paging, or is limited to an airborne telephone. If it is determined that the AGRAS number also corresponds to a pager, a known paging sequence is initiated in step S126.

Next, from the AGRAS number and call-back number input by the calling party to NPCC computer 22, data signal 21 is formed (step S128). Data signal 21 comports with existing protocol filed with the FCC and is uplinked from uplink unit 24 to satellite 26 (step S130) and is subsequently received by each downlink unit 28 (step S132). After data signal 21 is received by downlink units 28, it is determined whether the destination address 62 of data signal 21 corresponds to the ground station 30 associated with downlink unit 28. If destination address 62 does not correspond to ground station 30, i.e., ground station 30 is not located in a selected region, then operation is terminated (step S136). Otherwise, operation continues and data signal 21 is unpacked by unpacking unit 38 (step S138). In step S140, it is determined whether the AGRAS number unpacked by unpacking unit 38 is invalid. This step is performed to ensure that no transmission errors or skewing of data has occurred. If the AGRAS number is not invalid, then the call-back number is passed from unpacking unit 38 to queue 42 (step 144). In step 146 it is determined whether ground station 30 is busy, i.e., it is determined whether that particular ground station is already in communication with an airborne telephone. If ground station 30 is busy, then operation passes to a first timing circuit represented by steps S148, S150, and S152 in which a first timer is decremented, it is determined whether the first timer has elapsed, and it is again determined whether ground station 30 is busy. This process preferably repeats for a period of approximately 90 seconds in order to maximize the possibility that ground station 30 becomes available to subsequently pass call signal 31 to transmit/receive unit 32. If ground station 30 remains busy, then operation of the system terminates. If ground station 30 is not initially busy in step S146, or ground station 30 has become available during the decrement of the first timing circuit, system operation proceeds to step 154 in which call signal 31 is passed from ground station 30 to transmit/receive unit 32, which subsequently transmits call signal 31 to the airborne telephone on aircraft 34. If aircraft 34 is within transmission range of a particular transmit/receive unit 32, the airborne telephone will respond to call signal 31 with aircraft response signal 35. If the airborne telephone does not respond initially to call signal 31, then a second timing circuit is entered in which the airborne telephone is allowed a predetermined period of time to respond to call signal 31. If the airborne telephone on aircraft 34 does not respond to call signal 31 within the allotted time, then operation is terminated in step S162. If the airborne telephone responds to call signal 31 by transmitting aircraft response signal 35 to transmit/receive unit 32, then the airborne telephone will begin to ring. It is then determined in step S164 whether the airborne telephone has been answered, i.e., it is determined whether the receiver of the airborne telephone has gone off-hook.

The user of the airborne telephone is given a predetermined amount of time, as shown in steps S166, S168, and S170, in which to answer the airborne telephone. If the user answers the airborne telephone within this time, then PSTN coupler 48 in ground station 30 initiates a telephone call to the call-back number stored in queue 42 over the PSTN (step S172). If the calling party answers (step S174), then a clock is initiated in order to record the length of the call for billing purposes. As long as the airborne telephone is off-hook (step S180) the clock is incremented (step S182). When the user of the airborne telephone hangs up, then the elapsed time of the telephone call is recorded for billing purposes (step S184) and operation of the system is terminated (step S186).

The ground-to-air telephone calling system and related method of the subject invention thus provide a combination of features which permit a ground based calling party to establish telephonic communication with an airborne telephone of unknown location. Thus, the system of the present invention provides a distinct improvement over prior art airborne telephone systems. Furthermore, no modification on the part of existing airborne telephones is required by the present invention. Moreover, all signals used by the system of the present invention fully comply with existing protocol filed with the FCC.

Additional advantages and modifications will readily occur to those skilled in the art. The invention in its broader aspects is, therefore, not limited to the specific details, representative apparatus and illustrative method shown and described. For example, instead of communicating the data and call signals over a combination of land lines and satellite links as illustrated, these signals may be communicated by other means or techniques or by any combination thereof which achieves the communication speed required in ground-to-air communication. Accordingly, departures may be made from such details without departing from the spirit or scope of applicants' generic inventive concept as set forth in the appended claims.

What is claimed is:

1. A system for establishing a communication link between a ground based caller and a telephone unit aboard an airborne aircraft, comprising:

means for generating a first signal in response to a telephone call from said ground based caller, said first signal including a telephone number of said ground based caller;

means for transmitting said first signal to each of a plurality of ground units, each of said plurality of ground units comprising:

means for receiving said first signal;

means for storing said telephone number of said ground based caller;

means for generating a second signal in response to said first signal, said second signal not including said telephone number of said ground based caller; and means for transmitting said second signal throughout a corresponding region;

wherein said telephone unit is capable of responding to said second signal from a ground unit corresponding to a region in which said aircraft is located and of transmitting a third signal to said ground unit corresponding to the region in which said aircraft is located, said third signal not including said telephone number of said ground based caller;

each of said plurality of ground units further comprising:

means for receiving said third signal from said telephone in said aircraft when said aircraft is located in the corresponding region; and means for establishing a telephone connection between the ground unit and said ground based caller in response to said third signal using said stored telephone number of said ground base caller.

2. A system according to claim 1, wherein said second signal includes data identifying said telephone unit.

3. A system according to claim 1, wherein each of said plurality of ground units further includes delay means for delaying transmission of said second signals by a predetermined time period when the ground unit is busy.

4. A system according to claim 1, further comprising means for selectively activating only predetermined ones of said plurality of ground units.

5. A method of establishing a communication link between a ground based caller and a telephone unit aboard an airborne aircraft, comprising the steps of:

generating a first signal in response to a telephone call from said ground based caller, said first signal including a telephone number of said ground based caller;

transmitting said first signal to a plurality of ground stations:

receiving said first signal at each of said plurality of ground stations;

storing said telephone number of said ground based caller at each of said plurality of ground stations;

generating a second signal at each of said plurality of ground stations in response to said first signal, said second signal not including said telephone number of said ground based caller;

transmitting said second signal throughout regions corresponding to each of the ground stations;

receiving one of said second signals at said telephone unit in said airborne aircraft;

generating a third signal at said telephone unit in response to said one of said second signals, said third signal not including said telephone number of said ground based caller;

transmitting said third signal to a ground station which transmitted said one of said second signals; and calling said ground based caller from said ground station which transmitted said one of said second signals in response to said third signal using said stored telephone number of said ground based caller.

6. A method according to claim 5, wherein said second signal includes data identifying said telephone unit.

7. A method according to claim 5, further comprising the step of delaying transmission of said second signals by a predetermined time period when a corresponding ground station is busy.

8. A method according to claim 5, further comprising the step of selectively activating only predetermined ones of said plurality of ground stations.

* * * * *

UNITED STATES PATENT AND TRADEMARK OFFICE
CERTIFICATE OF CORRECTION

PATENT NO. : 5,278,891

DATED : January 11, 1994

INVENTOR(S) : Jai P. BHAGAT, ET AL.

It is certified that error appears in the above-identified patent and that said Letters Patent is hereby corrected as shown below:

Claim 1, col. 8, line 4, change "base" to --based--.

Signed and Sealed this

Twenty-fourth Day of May, 1994

Attest:

BRUCE LEHMAN

Attesting Officer

Commissioner of Patents and Trademarks